US006113855A

United States Patent [19]

Buechler

[11] Patent Number: 6,113,855

[45] Date of Patent: *Sep. 5, 2000

[54] DEVICES COMPRISING MULTIPLE CAPILLARITY INDUCING SURFACES

[75] Inventor: Kenneth Francis Buechler, San Diego, Calif.

[73] Assignee: Biosite Diagnostics, Inc., San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/749,702

[22] Filed: Nov. 15, 1996

[51] Int. Cl.[7] .......... G01N 21/11

[52] U.S. Cl. .......... 422/58; 422/61; 422/100; 422/102

[58] Field of Search .......... 422/55–61, 100, 422/102

[56] References Cited

U.S. PATENT DOCUMENTS

| | | | |
|---|---|---|---|
| 4,426,451 | 1/1984 | Columbus | 436/518 |
| 4,539,182 | 9/1985 | Johnson et al. | 422/99 |
| 4,963,498 | 10/1990 | Hillman et al. . | |
| 4,983,038 | 1/1991 | Ohki et al. . | |
| 5,051,237 | 9/1991 | Grenner et al. . | |
| 5,079,142 | 1/1992 | Coleman et al. | 435/7.92 |
| 5,137,808 | 8/1992 | Ullman et al. . | |
| 5,202,268 | 4/1993 | Kuhn et al. | 436/525 |
| 5,458,852 | 10/1995 | Buechler | 422/58 |

FOREIGN PATENT DOCUMENTS

| | | |
|---|---|---|
| 0 288 029 A2 | 10/1988 | European Pat. Off. . |
| 105 084 | 12/1994 | Germany . |

*Primary Examiner*—Jan Ludlow

[57] ABSTRACT

Assay device structures for a device where fluid flows from a one region to another. The device structures have one or more capillarity-inducing structures; where the capillarity-inducing structure induces capillary force along an axis that is essentially perpendicular to the axis along which capillary force induced in another region of the device.

18 Claims, 4 Drawing Sheets

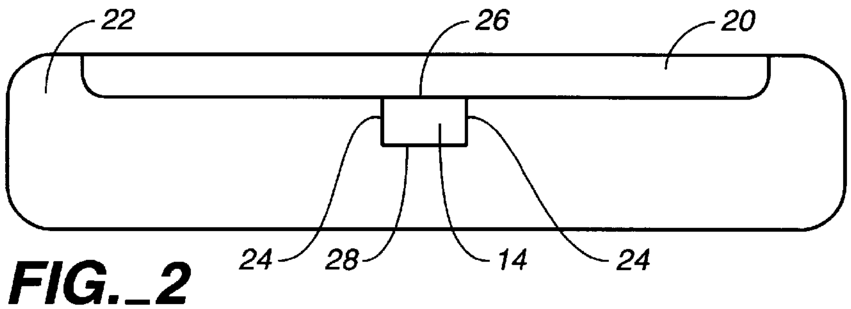
FIG._2
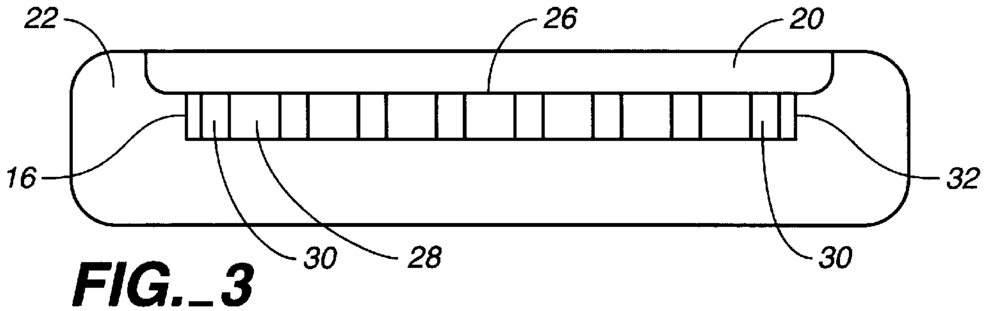
FIG._3
FIG._5A
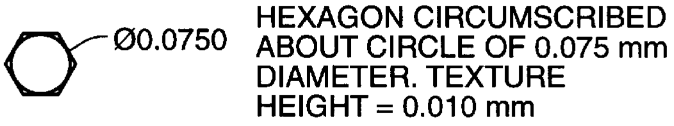
FIG._5B
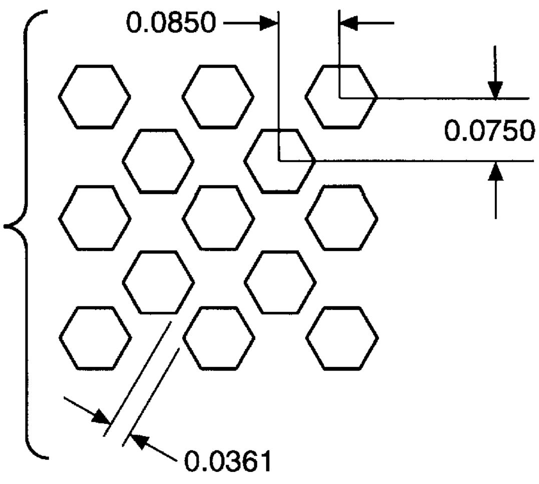

DEVICES COMPRISING MULTIPLE CAPILLARITY INDUCING SURFACES

FIELD OF THE INVENTION

This application concerns capillarity, also referred to as capillary action or capillary force. In a particular embodiment, the invention concerns an assay device that comprises multiple capillary force-inducing surfaces having distinct positional orientations.

BACKGROUND ART

With the advent of field-based testing and point of care testing in hospitals, it has become increasingly important to develop diagnostic products which are simple, rapid and convenient for use. In these contexts, results are generally needed rapidly, with a minimum of time given to the performance of a test. Providing an assay result in minutes allows prompt action to be taken in a hospital or field setting.

Field-based testing (i.e., a non-laboratory setting) has become increasingly common. Such non-laboratory settings include, e.g., environmental testing for contaminants, testing in workplaces, and testing in sports medicine at an activity site. Testing in non-laboratory settings may often be performed by individuals who have minimal training in the conducting of assays, or those who do not regularly conduct assays. Additionally, non-laboratory settings often lack the same level of access to assay equipment or reagents found in laboratories. Thus, it would be advantageous to have an assay device for use in a non-laboratory setting that is simple to use, and where the device does not necessitate laboratory equipment beyond the assay device itself; such devices are also advantageous in hospital/laboratory settings.

Point of care and non-laboratory testing is facilitated by compact small devices which are convenient to transport and use. Preferably the design is easily manipulated by the individual performing the assay. It is also preferable that the assay device be capable of being fed into hand-held instrument that provides a determination (qualitative or quantitative) of the assay result. Devices capable of being fed into hand-held instruments (such as a reader) are preferably compact and have a flattened configuration.

Preferably a device for use in point of care or non-laboratory settings does not require any additional equipment to affect an assay. This feature makes the device easier to use and avoids the need to purchase or use any additional equipment. For example, it is preferred that such a device does not require externally applied pressure.

Capillary force has been used to achieve movement in assay devices without externally applied pressure. To achieve such movement, e.g., assay material is placed in a proximal location in the device, a location that contains a base level of capillary force. One or more distal regions contain surfaces that induce comparable or greater capillary force than the base level at the proximal location. If more than one distal region contains surfaces that induce capillary force, the effective amount of capillary force induced is successively greater at each distal region, or is comparable in all regions so that there is proximal to distal movement of fluid through the device.

A problem with the use of capillarity as a means to achieve proximal-to-distal movement through a device concerns the fluid volume required to perform an assay, i.e., the "assay volume." An assay result is often achieved only when the sample has traveled through the device. In some cases, e.g., when bound label is used as a means of detection of an analyte, an assay result is only achieved when the unbound label is removed from the zone in which the bound label is detected. Moreover, if multiple reactants must be added to the device, the distal region of the device must accommodate sufficient volume for the sample and all reactant fluids. However, in order to achieve sufficient distal capillarity in a compact device, dimensions in the distal areas are often extremely minute. Moreover, minute dimensions are often desired in assay devices to improve reaction kinetics, by minimizing diffusion distances for the assay reagents.

If sample and non-sample fluids must be accommodated distally, devices with sufficient capillarity and the requisite capacity have highly impractical configurations for laboratory or field settings. If a capillary in a distal region is made larger to accommodate an assay volume (a reaction volume and other needed volumes), the drop in capillarity in that region often impairs fluid flow into the region.

Accordingly, there is a need for an efficient, compact, economical device that permits the assay result to be readily determined. It is also preferable that the device not necessitate additional assay equipment in order for an assay to be performed.

DESCRIPTION OF FIGURES

FIG. 2 depicts a cross-section of FIG. 1 taken along plane 2—2 of FIG. 1; FIG. 2 depicts device 10 having lid 20 in place.

FIG. 3 depicts a cross-section of FIG. 1 taken along plane 3—3 of FIG. 1; FIG. 3 depicts device 10 having lid 20 in place.

FIGS. 5A–B depicts a capillarity inducing structure (Panel A) and an array of said structures (Panel B) of a distal region of one embodiment of the invention.

DISCLOSURE OF THE INVENTION

Figure 1:
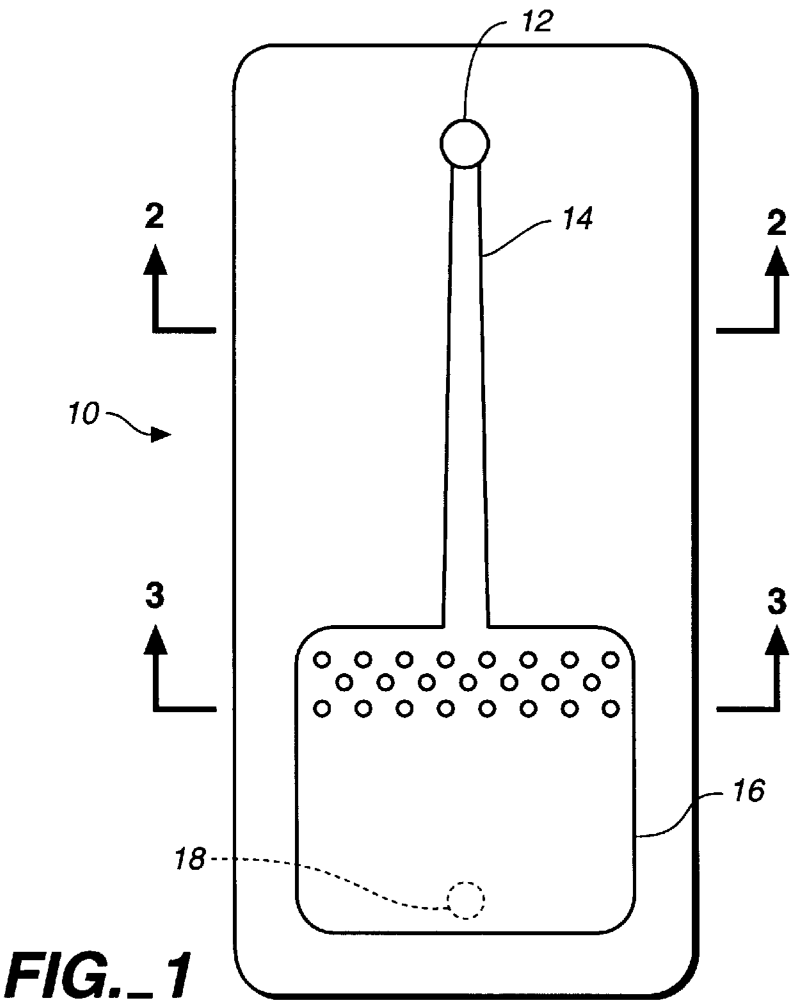
FIG. 1 is schematic depicting a top view of a device 10 in accordance with the invention with lid 20 removed to permit viewing; the fluid access port of lid 20 is shown in broken lines in the location it would have with the lid in place.

Disclosed is a device comprising a "proximal" region and a "distal" region, wherein the proximal region comprises an effective capillary induced along a first axis, and the distal region comprises an effective capillary induced along a second axis, where the minimum distance which the first axis and the second axis are disposed relative to one another is between 40° and 90°. The device can comprise one or more regions which themselves comprise a capillarity-inducing structure; such structures can be in a regular or irregular array. Each capillarity-inducing structure of the array can be substantially uniform. In one embodiment, a capillarity-inducing structure comprises an essentially hexagonal configuration when viewed along at least one plane.

Also disclosed is an assay device comprising a proximal region and a distal region fluidly connected to the proximal region, whereby fluid flows from the proximal region to the distal region without application of an external force, and said distal region comprises at least one capillarity-inducing structure. The proximal region can comprises a lower effective capillarity than the distal region, or the proximal region can comprise similar capillarity relative to the distal region so that fluid will flow between the proximal and distal regions. The distal region of this embodiment can comprise an array of capillarity-inducing structures; each structure of the array can be regularly spaced relative to adjacent capillarity-inducing structures.

A capillarity-inducing structure can comprise an essentially uniform configuration taken along any cross-sectional dimension, or can have an irregular configuration in one or more dimensions. In one embodiment, a distal region can comprise an essentially regularly spaced array of essentially uniformly hexagonally shaped capillarity-inducing structures, when viewed from a perspective essentially perpendicular to a direction of capillary fluid flow through the device.

It is understood that proximal and distal are used for clarity, e.g., fluid can be added at a distal region of a device such that it flows toward a proximal region of the device. Capillarity inducing structures can be located in proximal or distal regions.

LIST OF REFERENCE NUMERALS

10. Device
12. Fluid Addition Port
14. Proximal Region
16. Distal Region
18. Air Escape Port
20. Lid
22. Base
24. Lateral Wall of Proximal Region 14
26. Inner Surface of Lid 20
28. Bottom Surface of Base 22
30. Capillarity-Inducing Structure
32. Lateral Wall of Distal Region 16
34. A distance between a capillarity-inducing structure 30 and a lateral surface of distal region 16.
36. A distance between adjacent capillarity-inducing structures 30.

MODES FOR CARRYING OUT INVENTION

Disclosed herein for the first time in the art are assay device structures that accomplish the objectives of permitting a compact assay device configuration together with enhanced assay volumes. When conducting an assay in laboratory or non-laboratory settings, it is frequently desired that only a small amount of sample to be assayed be provided, compact devices are well suited to this aspect. Additionally, devices comprising microcapillaries are generally preferred because they are readily manipulated and they provide for enhanced reaction kinetics. It is advantageous for the device to be approximately the size of a human hand. This size facilitates manipulation of the device, making it easier for the individual conducting the assay to place any assay reactants into the device. Additionally, devices which are readily held in the human hand are of a size that facilitates packing, shipping and storage of the devices.

However, small devices have limited capacity, and this capacity can be insufficient for a requisite reaction volume or assay volume. The assay device structures disclosed herein achieve fluid flow through an assay device; advantageously, this fluid flow is accomplished by use of capillarity without a need to employ any additional external force such as hydrostatic pressure. As discussed in greater detail below, preferred device structures comprise a capillary region of the device that permits compact design configurations, while still achieving an effective capillary force to result in fluid flow, while increasing the fluid capacity of the device.

As appreciated by one of ordinary skill in the art, fluid moves between regions of similar capillarity or moves from regions of lower capillarity, to regions of higher capillarity. When small sample volumes are utilized in a device that achieves fluid flow pursuant to capillary action, especially minute distances are required between opposing surfaces in order to achieve requisite levels of capillary force.

Unless special design parameters are integrated into a device where fluid flows by capillary action, fluid flow stops at a point where it reaches and fills the region having the highest level of capillary force. As an example of a special design structure which permits fluid flow past a region of higher capillarity into a region of lower capillarity (see e.g., U.S. Pat. No. 5,458,852, to Buechler, issued Oct. 17, 1995; and copending U.S. application Ser. No. 08/447,895, filed May 23, 1995, now U.S. Pat. No. 6,019,944 which are incorporated by reference herein).

If a capillary tube of generally cylindrical cross-section is utilized to achieve capillarity at a distal region, there are numerous disadvantages; typically, this would require an assay device having an elongated configuration. If the end result of the assay is determined from fluid located at the distal-most end of the device it can be difficult to obtain an accurate reading from material contained in the narrow and elongated capillary tube in this region. Furthermore, the devices must contain a minimum assay volume in order to produce an assay result. A capillary tube distal region would need to be exceptionally long to accommodate the reaction volume while still inducing the necessary capillary force, effectively precluding a shape that is either hand held or readily manipulated by an individual conducting an assay.

In practice, designing capillary spaces in assay devices requires that several considerations be taken into account. First, there is a reaction volume which interacts with various reagents, this is generally the volume of sample required to achieve a significant signal above background. A capillary in a device must generally accommodate this volume. Second, if the assay requires separation of bound from unbound signal generator or label (such as would be required for a competitive, non-competitive or nucleic acid hybridization assays on solid phases) then a wash volume of fluid is required to wash away the unbound signal generator or label from the detection area in a device. Generally, the wash volume is approximately 0.5 to 10-times the reaction volume. A capillary in an assay device must often accommodate a wash volume. Third, when an assay requires binding of reactants to a solid phase, the capillary space should be as small as possible to improve the kinetics of the reaction. Surface bound reactants can include, for example, a solid phase bound antibody which reacts with sample antigen, a solid phase bound antigen that reacts with an antibody, or a surface bound nucleic acid that hybridizes to another nucleic acid. Capillary spaces on the order of 0.5 $\mu$m to 200 $\mu$m are useful for these binding reactions. Fourth, when the reaction and wash volumes are defined, then the total volume that the device is required to hold is calculated; this volume is referred to as the assay volume.

When the assay volume that a device requires is greater than the actual volume that the device holds, then the device capillaries must be made larger to accommodate the volume, this offsets the kinetic advantages from microcapillaries of a small device.

The present invention is particularly useful in compact devices (having rapid reaction kinetics) where the device volume would otherwise be insufficient to accommodate the assay volume. Pursuant to the present invention, one can design a device where fluid moves by capillary force, where the device comprises a given force-inducing capillary space, concomitantly increasing the capacity of the device. The capacity is increased without decreasing the capillarity of the device, and without increasing the size of the device.

In accordance with the present invention, assay device surfaces are provided whereby the opposing surfaces which induce capillary force distally have a different positional orientation relative to more proximal capillarity-inducing surfaces.

For convenience herein, the following terms will be utilized in describing an embodiment of the invention, it is understood that this terminology is in no way limiting on the invention. A compact assay device having a flattened configuration will be discussed. This device has a proximal region to which sample fluid is added. Distal to the proximal region are one or more regions that have similar or higher capillarity than the sample addition region. FIG. 1 depicts a top view of an assay device; regions of the device are not drawn to scale. As shown in FIG. 1, device 10 contains fluid addition port 12. A proximal region 14 is fluidly connected to addition port 12. A distal region 16 is fluidly connected to proximal region 14 at a junction. Contiguous with distal region 16 is an escape port 18, to permit fluids such as gas to escape, allowing fluid flow through the device and into region 16.

FIG. 2 depicts a cross-section of device 10 taken along line 2—2 in FIG. 1. As seen in FIG. 2, a lid 20 and base 22 serve to define a cross-sectional area of proximal region 14. In a typical design configuration, the distance between lateral walls 24 is appreciably greater than the distance between the inner surface 26 of lid 20 and bottom surface 28 of base 22; this configuration permits fluid flow through the device to be readily viewed by an individual conducting the assay by looking through a device embodiment comprising a transparent or translucent lid 20. Again referring to FIG. 2, it is seen that the surfaces creating the greatest amount of capillary force in proximal region 14 are inner surface 26 of lid 20 and bottom surface 28 of lid 22. For convenience, herein surface 26 is referred to as an upper surface, and bottom surface 28 is referred to as a lower surface. In the context of the figures, the capillarity force is said to be along the "Y" axis, or in a vertical direction.

If one attempted to use a design configuration analogous to that of proximal region 14 in distal region 16 such that region 16 could contain the assay volume, it would require the upper surface and the lower surface to be exceedingly close to one another, and the distal region would need to continue for an impractically long distance. Alternatively, the distal region would require an exceptionally wide distance between lateral walls defining the space. If one attempted to balance the length and width at the distal region to provide a squared configuration, it is then very difficult to manufacture surfaces that are a uniform distance apart throughout the entire region. These design problems are exacerbated when producing a design where the distal region accommodates an appreciable assay volume.

To overcome such design limitations, the preferred embodiment of the invention comprises a distal region such as depicted in FIG. 3. FIG. 3 is a cross-section of an embodiment taken along line 3—3 in FIG. 1. For purposes of illustration, FIG. 3 is not drawn to scale.

As shown in FIG. 3, in a preferred embodiment, one or more capillarity-inducing structures 30 are provided in a device in accordance with the invention, most preferably an array of such structures are provided.

Again referring to FIG. 3, capillarity-inducing structures are configured so that the distance between two or more lateral surfaces (e.g., the minimum distance between a lateral wall 32 of distal region 16 and capillarity inducing structure 30 or between two adjacent capillary inducing structures 30) is approximately the same or less than the distance between lower surface 26 of lid 20 and upper surface 28 of base 22. When this configuration is utilized, the distance between the lower surface of the lid and the upper surface of the base can be increased in the region comprising capillarity-inducing structures, thereby enlarging the capacity of the region.

In accordance with the design as depicted in FIG. 1, FIG. 2, and FIG. 3, it is seen that the proximal region comprises capillarity induced by the distance between inner surface 26 of lid 20 and bottom surface 28 of base 22. As depicted in these figures, the capillarity is induced in a vertical direction. In contrast, the capillarity-inducing surfaces in distal region 16 are lateral surfaces; capillary force is induced in a horizontal direction. The direction of capillary force in the distal region is referred to as the "X" axis relative to the "Y" axis of capillarity force in the proximal region.

An advantageous aspect of the present invention is that, since the capillarity in the distal region is induced in a horizontal direction by lateral surfaces, that the relative spacing of the upper and lower surfaces do not significantly impact capillarity in the region. Accordingly, the upper and lower surfaces can be spaced apart so as to permit a compact device having closely spaced surfaces to accommodate any necessary assay volume. Thus, devices are provided that provide good reaction kinetics, are compact, and which readily accommodate assay volumes not otherwise permitted in devices of such configuration.

It is understood that in order to achieve fluid flow from proximal region 14 to distal region 16, the effective capillary force of distal region 16 must be similar to or greater than that of proximal region 14. As appreciated by one of ordinary skill in the art in view of the disclosure herein, a sufficient number of capillarity-inducing structures 30 are provided in distal region 16 to achieve the requisite effective capillarity in the distal region. Although it is possible for the distance between two adjacent lateral surfaces in the distal region to be greater than the distance between an upper and lower surface in that region, the effective capillary force for the distal region must be similar to or greater than that for the proximal region so that fluid will flow between these two regions. Typically, an array of capillarity-inducing structures are utilized, where the effective capillarity of the region is induced by lateral surfaces of adjacent capillarity inducing structures. Preferably, capillary-inducing structures have a uniform shape and are spaced in a regular pattern.

Figure 4:
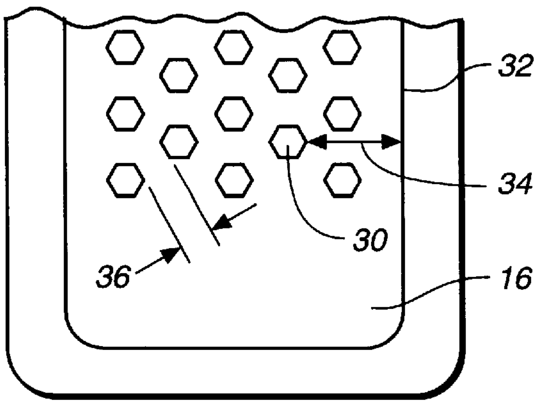
FIG. 4 depicts a top view of distal region 16 of one embodiment of the invention.

FIG. 4 depicts a top view of distal region 16 of one embodiment of the invention. As seen in FIG. 4, there is a distance 34 between a capillarity-inducing structure 30 and lateral wall 32 of distal region 16, this distance is greater than the distance between inner surface 26 of lid 20 and bottom surface 28 of base 22 in proximal or distal regions (not depicted in this view). For this embodiment, proximal region 14 had a capillary force induced by the distance between the opposing surfaces 26 and 28. Nevertheless, the effective capillary force of distal region 16 is greater than proximal region 14 in the device due to the array of capillarity-inducing structures provided. In this embodiment, the effective capillarity is induced by a distance 36 between adjacent capillary-inducing structures, rather than by a distance between the lid and the base.

In the embodiment depicted in FIG. 4, capillarity-inducing structures 30 have a hexagonal configuration in top view and these structures are placed in a regular array in part or all of the distal region. It is understood that other top-view configurations are also possible, such as geometric or organic shapes. Further, although a regular array of capillarity-inducing structures is preferred, a random array is also encompassed within the invention, so long as distal region 16 comprises an effective capillary force produced in accordance with the principles of the invention. Each hexagonal structure preferably has six essentially planar sides when viewed 360° full circle from a perspective such as that in FIG. 4.

Preferably, capillarity-inducing structures 30 have a regular configuration when viewed in cross-section, such as seen in FIG. 3 or FIG. 4. It is understood, however, that capillarity-inducing structures can comprise irregular configurations when viewed from a perspective such as in FIG. 3 or FIG. 4.

As disclosed herein, it is seen that the effective capillarity in proximal region 14 is less than the effective capillarity in distal region 16, or the relative capillarities are similar such that fluid will flow between these regions. In proximal region 14, capillary force is induced between upper and lower surfaces, i.e., along the vertical or "Y" axis. The capillary force in distal region 16 is induced by lateral surfaces with capillary force being induced in the horizontal or along the "X" axis. For example, capillarity in region 16 is induced by the distance between lateral wall 32 of base 16 and capillarity-inducing structure 30 and/or between adjacent capillarity-inducing structures (distance 36). In accordance with the invention, capillarity-inducing structures can be placed in proximal or in distal regions.

EXAMPLES

Several embodiments have been constructed which exemplify the principles of the present invention. In accordance with these examples, it is shown that fluid flowed between two regions; for each example, flow was seen to occur in a proximal-to-distal as well as a distal-to-proximal direction.

For the following embodiments of devices comprising two or more capillary regions in fluid connection, the following capillary regions were utilized:

The capillary region depicted in FIG. 5 comprised an array of hexagonal structures. When seen from a top view, each structure had a form of a hexagon circumscribed around a circle of 75 microns in diameter, as depicted in FIG. 5A. As shown in FIG. 5B, the array of structures constituted a regular placement of structures in linear rows in a proximal to distal direction. Each structure in a given linear row was positioned 170 microns from the position of each adjacent structure in that row. Each linear row was staggered (proximal-distal) relative to each adjacent linear row by a distance of 85 microns. Each adjacent linear row was laterally displaced 75 microns relative to each adjacent row. The distance between two parallel sides of adjacent structures was 36.1 microns in this embodiment.

In the embodiment of FIG. 5, the distance between the lid and the base of this region was 12 microns; this was the distance believed to induce the capillarity in this region. For the embodiment depicted in FIG. 5, each structure was 10 microns high. The 2 micron distance between the top of a hexagonal structure and the lid merely filled with liquid, then ceased to impact the effective capillarity of the region. The hexagonal structures served to decrease the surface tension of a fluid flow front, whereby the fluid flow front was essentially perpendicular to lateral walls.

Figure 6A:
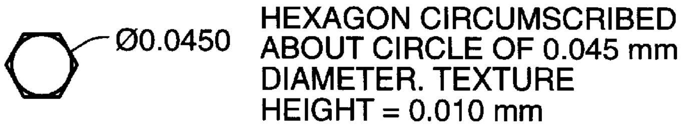
FIGS. 6A–B depicts a capillarity inducing structure (Panel A) and an array of said structures (Panel B) of a capillary region of one embodiment of the invention.
Figure 6B:
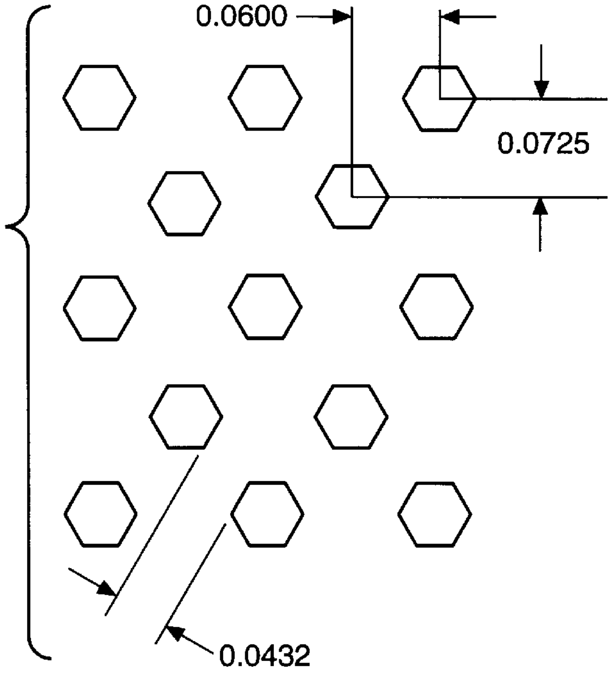

The region depicted in FIG. 6 comprised an array of structures. When seen from a top view, each structure had a form of a hexagon circumscribed around a circle of 45 microns in diameter, as depicted in FIG. 6A. As shown in FIG. 6B, the array of structures constituted a regular placement of structures in linear rows in a proximal to distal direction. Each structure in a given linear row was positioned 120 microns from the position of each adjacent structure in that row. Each linear row was staggered (proximal-distal) relative to each adjacent linear row by a distance of 60 microns. Each linear row was laterally displaced 72.5 microns relative to each adjacent row. The distance between two parallel sides of adjacent structures was 43.2 microns in this embodiment.

In the embodiment of FIG. 6, the distance between the lid and the base of this region was 12 microns; this was the distance believed to induce the effective capillarity of this region. Each hexagonal structure for the embodiment depicted in FIG. 6 was 10 microns high. The 2 micron distance between the top of a hexagonal structure and the lid merely filled with liquid, then ceased to impact the effective capillarity of the region. The hexagonal structures served to decrease the surface tension of a fluid flow front, whereby the fluid flow front was essentially perpendicular to lateral walls.

Figure 7A:
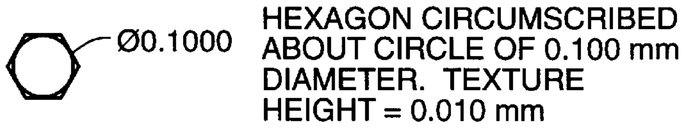
FIGS. 7A–B depicts top views of a capillarity inducing structure (Panel A) and an array of said structures (Panel B) of a capillary region of one embodiment of the invention.
Figure 7B:
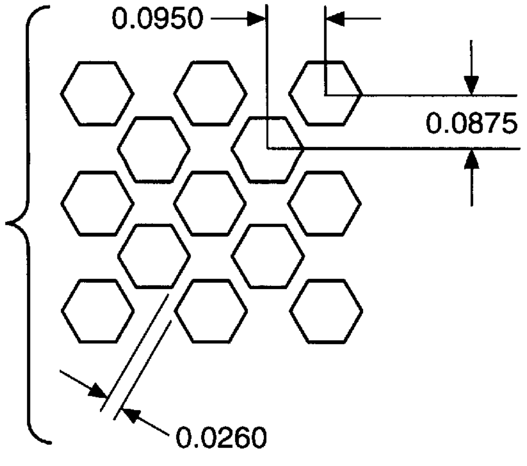

The region depicted in FIG. 7 comprised an array of structures. When seen from a top view, each structure had a form of a hexagon circumscribed around a circle of 100 microns in diameter, as depicted in FIG. 7A. As shown in FIG. 7B, the array of structures constituted a regular placement of structures in linear rows in a proximal to distal direction. Each structure in a given linear row was positioned a distance of 190 microns from the position of each adjacent structure in that row. Each linear row was staggered relative to each adjacent linear row by a distance of 95 microns. Each linear row was laterally displaced (proximal-distal) 87.5 microns relative to each adjacent row. The distance between two parallel sides of adjacent structures was 26 microns in this embodiment.

In the embodiment of FIG. 7, the distance between the lid and the base of this region was 12 microns; this was the distance believed to induce the effective capillarity of this region. Each structure in the embodiment depicted in FIG. 7 was 10 microns high. The 2 micron distance between the top of a hexagonal structure and the lid merely filled with liquid, then ceased to impact the effective capillarity of the region. The hexagonal structures served to decrease the surface tension of a fluid flow front, whereby the fluid flow front was essentially perpendicular to lateral walls.

Figure 8A:
FIGS. 8A–B depicts top views of a capillarity inducing structure (Panel A) and an array of said structures (Panel B) of a capillary region of one embodiment of the invention.
Figure 8B:
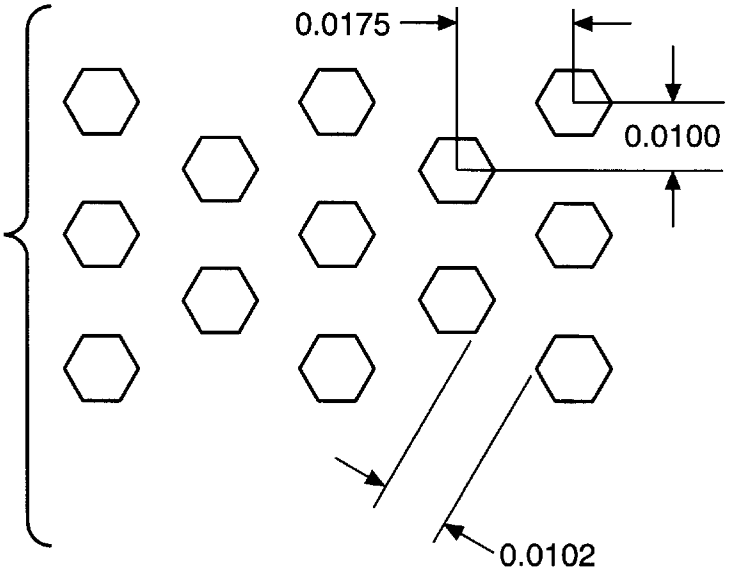

The capillary region depicted in FIG. 8 comprised an array of capillarity-inducing structures. When seen from a top view, each capillarity-inducing structure had a form of a hexagon circumscribed around a circle of 10 microns in diameter, as depicted in FIG. 8A. As shown in FIG. 8B, the array of capillarity-inducing structures constituted a regular placement of capillarity-inducing structures in linear rows in a proximal to distal direction. Each capillarity-inducing structure in a given linear row was positioned a distance of 35 microns from the position of each adjacent capillarity-inducing structure in that row. Each adjacent linear row was staggered relative to each adjacent linear row by a distance of 17.5 microns. Each adjacent linear row was laterally displaced 10 microns relative to each adjacent row. The distance between two parallel sides of adjacent capillarity-inducing structures was 10.2 microns in this embodiment; this was the distance believed to induce the effective capillarity of this region. For the embodiment depicted in FIG. 8, each capillarity-inducing structure was 20 microns high. The distance between the lid and the base in this region was 22 microns. The 2 micron distance between the top of a capillarity-inducing structure and the lid merely filled with liquid, then ceased to impact the effective capillarity of the region.

Figure 9A:
FIGS. 9A–B depicts top views of a capillarity inducing structure (Panel A) and an array of said structures (Panel B) of a capillary region of one embodiment of the invention.
Figure 9B:
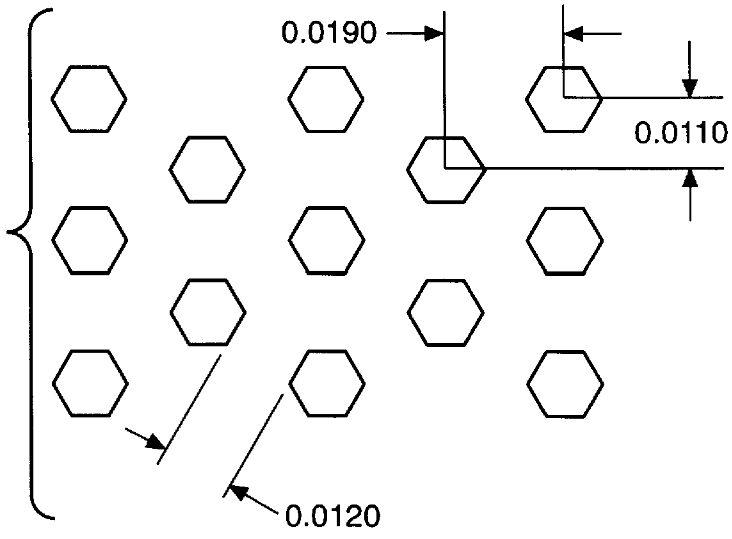

The capillary region depicted in FIG. 9 comprised an array of capillarity-inducing structures. When seen from a top view, each capillarity-inducing structure had a form of a hexagon circumscribed around a circle of 10 microns in diameter, as depicted in FIG. 9A. As shown in FIG. 9B, the array of capillarity-inducing structures constituted a regular placement of capillarity-inducing structures in linear rows in a proximal to distal direction. Each capillarity-inducing structure in a given linear row was positioned a distance of 38 microns from the position of each adjacent capillarity-inducing structure in that row. Each linear row was staggered relative to each adjacent linear row by a distance of 19 microns. Each linear row was laterally displaced 11 microns relative to each adjacent row. The distance between two parallel sides of adjacent capillarity-inducing structures was 12 microns in this embodiment; this was the distance believed to induce the effective capillarity of this region. For the embodiment depicted in FIG. 9, each capillarity-inducing structure was 20 microns high. The distance between the lid and the base in this region was 22 microns. The 2 micron distance between the top of a capillarity-inducing structure and the lid merely filled with liquid, then ceased to impact the effective capillarity of the region.

Example 1

In this embodiment, fluid was found to flow between a proximal region comprising an array of structures as depicted in FIG. 7B, and a distal region comprising an array of capillarity-inducing structures such as depicted in FIG. 8B. The effective capillarity of the proximal region was believed to be induced by the 12 micron distance from the inner surface of the lid to the upper surface of the base, i.e., capillary force induced in a "vertical" direction. The effective capillarity of the distal region was believed to be induced by the 10.2 micron distance between parallel walls of adjacent capillarity-inducing structures, i.e., capillary force induced in a "horizontal" direction.

The proximal region comprised a height of 12 microns from the inner surface of the lid to the upper surface of the base; the height of the distal region was 22 microns from the inner surface of the lid to the upper surface of the base. Accordingly, the distal region had a greater capacity than the proximal region for a given area defined from the top view.

Example 2

In this embodiment, fluid was found to flow between a proximal region comprising an array of structures such as found in FIG. 6B, and a distal region comprising an array of capillarity-inducing structures such as depicted in FIG. 9B.

The effective capillarity of the proximal region was believed to be induced by the 12 micron distance from the inner surface of the lid to the upper surface of the base, i.e., capillary force induced in a "vertical" direction. The effective capillarity of the distal region was believed to be induced by the 12 micron distance between parallel walls of adjacent capillarity-inducing structures, i.e., capillary force induced in a "horizontal" direction.

The proximal region comprised a height of 12 microns from the inner surface of the lid to the upper surface of the base; the height of the distal region was 22 microns from the inner surface of the lid to the upper surface of the base. Accordingly, the distal region had a greater capacity than the proximal region for a given area defined from the top view.

Example 3

In this embodiment, fluid was found to flow between a proximal region comprising an array of structures such as depicted in FIG. 5B, and a distal region comprising an array of capillarity-inducing structures such as depicted in FIG. 8B.

The effective capillarity of the proximal region was believed to be induced by the 12 micron distance from the inner surface of the lid to the upper surface of the base, i.e., capillary force induced in a "vertical" direction. The effective capillarity of the distal region was believed to be induced by the 10.2 micron distance between parallel walls of adjacent capillarity-inducing structures, i.e., capillary force induced in a "horizontal" direction.

In this embodiment, the height of the first distal region was 12 microns from the inner surface of the lid to the upper surface of the base; the height in the distal region was 22 microns from the inner surface of the lid to the upper surface of the base. Accordingly, the distal region had a greater capacity than the proximal region for a given area defined from the top view.

Closing

Although the device has been described with reference to the embodiments depicted in the Figures, it is understood that the invention is not limited in any way by a particular embodiment. For example, base 10 need not itself comprise any portions which delimit lateral surfaces of either proximal region 14 or distal region 16. Lateral surfaces can be provided by a separate component discrete from lid 20 or base 22, or be provided by some component of lid 20.

The invention also encompasses a series of one or more proximal and/or one or more distal regions all in fluid connection. For example, where fluid flows sequentially between two or more regions comprising capillarity-inducing structures as well as flowing through a proximal region.

Although the terms horizontal, vertical, upper, lower, and lateral have been used herein, it is understood that these terms were provided to facilitate description of the invention as depicted in the Figures. It is also understood the relative orientations would change as a device is moved. Furthermore, the terms X-axis and Y-axis have been used; these terms are intended to designate relative linear orientations that are substantially disposed perpendicular to one another. By "substantially disposed perpendicular" to one another it is intended that the X and Y axes are disposed a minimum of between 40° and 90° relative to each other. Moreover, the orientation of the proximal and distal locations in the device can be reversed, such that the fluid addition zone is at the distal end, and fluid flows in a distal to proximal direction.

It must be noted that as used herein and in the appended claims, the singular forms "a," "and," and "the" include plural referents unless the context clearly dictates otherwise. Thus, for example, reference to "a formulation" includes mixtures of different formulations and reference to "the method of treatment" includes reference to equivalent steps and methods known to those skilled in the art, and so forth.

Unless defined otherwise, all technical and scientific terms used herein have the same meaning as commonly understood by one of ordinary skill in the art to which this invention belongs. Although any methods and materials similar to equivalent to those described herein can be used in the practice or testing of the invention, the preferred methods and materials are now described. All publications mentioned herein are incorporated herein by reference to describe and disclose specific information for which the reference was cited in connection with.

What is claimed is:

1. A device for use in an assay procedure, comprising:

a generally flat base, the base including at least one proximal region and at least one distal region, said at least one proximal region including a pair of opposite lateral walls and a floor, said at least one distal region including a pair of opposite lateral walls and a floor;

a generally flat lid, the lid including a lower surface;

at least one proximal region channel in said at least one proximal region defined by said opposite lateral walls of the base in the at least one proximal region, said floor in the at least one proximal region, and said lower surface of said lid;

at least one distal region channel in said at least one distal region in fluid communication with said at least one proximal region channel at a junction, said at least one distal region channel defined by said pair of opposite lateral walls in the at least one distal region, said floor in the at least one distal region, and said lower surface of said lid;

an array of capillarity inducing structures having lateral surfaces located in said at least one distal region channel and spaced from said junction, wherein the at least one proximal region channel adapted to induce an effective capillarity in the vertical direction by the floor of the base and the lower surface of the lid, and the at least one distal region channel adapted to induce an effective capillarity in a horizontal direction by the lateral surfaces of the capillarity inducing structures so as to cause a fluid to flow between the proximal region and the distal region.

2. The device of claim 1, wherein the at least one proximal region channel includes an array of capillarity inducing structures having lateral surfaces.

3. The device of claim 1, wherein the capillarity inducing structures include a shape from the group consisting of hexagonal, geometric, and organic.

4. The device of claim 1, wherein the at least one distal region channel is wider that the at least one proximal region channel.

5. The device of claim 1, wherein the at least one distal region channel is deeper that the at least one proximal region channel.

6. The device of claim 1, wherein the at least one proximal region includes a fluid addition port.

7. The device of claim 1, wherein the at least one distal region includes an escape port.

8. The device of claim 1, wherein the at least one proximal region comprises a lower effective capillarity than the distal region.

9. The device of claim 1, wherein the at least one proximal region comprises similar capillarity relative to the distal region so that the fluid will flow between the proximal and distal regions.

10. A device for use in an assay procedure, comprising:

a base, the base including at least one proximal region and at least one distal region, said at least one proximal region including at least one enclosed proximal region channel, said at least one distal region including at least one enclosed distal region channel in fluid communication with said at least one proximal region channel at a junction, the at least one distal region channel configured to accommodate an appreciable assay fluid volume, wherein the at least one proximal region is configured to provide an effective capillarity induced in a generally vertical direction in said at least one proximal region channel and the at least one distal region is configured to provide an effective capillarity induced in a generally horizontal direction in said at least one distal region channel so that fluid flows between the proximal region and the distal region;

wherein the at least one distal region channel includes an array of capillarity inducing structures having lateral surfaces that induce said effective capillarity in the general horizontal direction, said structures being spaced from the junction.

11. The device of claim 10, wherein the capillarity inducing structures include a shape from the group consisting of hexagonal, geometric, and organic.

12. The device of claim 10, wherein the at least one proximal region channel includes an array of capillarity inducing structures having lateral surfaces.

13. The device of claim 10, wherein the at least one distal region channel is wider that the at least one proximal region channel.

14. The device of claim 10, wherein the at least one distal region channel is deeper that the at least one proximal region channel.

15. The device of claim 10, wherein the at least one proximal region includes a fluid addition port.

16. The device of claim 10, wherein the at least one distal region includes a fluid escape port.

17. The device of claim 10, wherein the at least one proximal region comprises a lower effective capillarity than the distal region.

18. The device of claim 10, wherein the at least one proximal region comprises similar capillarity relative to the distal region so that the fluid will flow between the proximal and distal regions.

* * * * *

UNITED STATES PATENT AND TRADEMARK OFFICE

CERTIFICATE OF CORRECTION

PATENT NO. : 6,113,855 
DATED : September 5, 2000
INVENTOR(S) : Kenneth Francis Buechler It is certified that error appears in the above-identified patent and that said Letters Patent is hereby corrected as shown below:

Column 3,
Line 8, change "can comprises" to --can comprise--.

Signed and Sealed this

Fourteenth Day of August, 2001

Attest:

Nicholas P. Godici

NICHOLAS P. GODICI

*Attesting Officer* *Acting Director of the United States Patent and Trademark Office*